Patented Oct. 14, 1952

2,614,045

UNITED STATES PATENT OFFICE 2,614,045

PROCESSES FOR THE TREATMENT OF SOYA BEANS AND OTHER LEGUMINOUS SEEDS

Eric Mitchell Learmonth, Charlwood, England, assignor to British Soya Products Limited, London, England, a company of Great Britain No Drawing. Application April 7, 1950, Serial No. 154,729. In Great Britain April 8, 1949

3 Claims. (Cl. 99—99)

This invention relates to processes for the treatment of leguminous seeds, such as soya beans, lupin seeds, peas and beans other than soya beans, the most important of these products probably being the soya bean.

It is known that palatable products can be produced from soya beans but only after the beans have been treated in some way in order to remove the bitter flavour which they normally possess. Attempts have been made for many years to devise a simple and effective process for debittering soya beans which shall not be subject to certain disadvantages briefly referred to below.

Among the processes heretofore proposed have been treatment with steam under pressure, treatment with acids or alkalis and also treatment with gaseous reagents such as ammonia, sulphur dioxide and so on. The most successful and most widely adopted process so far known is that in which the beans are heated in an atmosphere of steam and subsequently dried and cooled. This process is effective in removing the bitter flavour from the beans but it has a number of disadvantages. For example, the process takes a considerable time and during the debittering step the beans absorb moisture which must be removed subsequently if the beans are to be ground or milled into flour or, indeed, if the beans are to be stored for any length of time, since the moisture-content at the end of the steaming operation is so high that the product will ferment or encourage the growth of moulds. A further disadvantage is that the heat applied to the beans must penetrate to the centres of the individual beans from the outside and larger beans require both a longer steaming treatment and a longer drying treatment than smaller ones, with the result that, unless the tedious and wasteful operation of first grading the beans is adopted (and most consignments contain large percentages of beans of very different sizes), either the larger beans are imperfectly debittered or the smaller ones are overheated, undesirable characteristics being produced in the finished product in both cases. Similar disadvantages are encountered in any of the known processes which involve the penetration of heat or a reagent into the beans from the outside.

Another and very important disadvantage of all the debittering processes so far available is that the enzymes normally present in the bean are generally destroyed, entirely or in large part, by the time the bitter flavour has been adequately removed. This is particularly the case with the enzyme peroxidase. The presence of these enzymes in soya products is of considerable importance in the preparation of bread but it has not been possible hitherto to use them for this purpose except by utilising soya flour which still contains the bitter principles and offensive flavour.

The object of the present invention is to provide an improved process for heat treating leguminous seeds, for debittering purposes in the case of soya beans and for similar purposes in the case of other leguminous seeds, which shall not be subject to the disadvantages mentioned while affording certain advantages of considerable value.

It has unexpectedly been found that soya beans can be debittered satisfactorily without the addition of treating media, such as steam, acids, alkalis and gaseous reagents, provided that the beans be heated rapidly and uniformly throughout their volume, in order to convert into steam part at least of the moisture contained therein, by the application of high frequency electric heating. This process has the further unexpected and highly advantageous result that the beans are adequately debittered while yet retaining substantially unimpaired their enzyme content, especially the peroxidase enzyme. Thus it becomes possible for the first time to prepare a soya flour having valuable enzymic properties but free from the bitter flavour.

According to the invention, therefore, a process for heat treating leguminous seeds comprises the step of subjecting the seeds to the heating effect of a high frequency alternating electric field.

It is preferred that the heating action be so regulated and the duration of the treatment be so determined that soya beans while being debittered will also have their moisture-content reduced to a level making the beans suitable for milling or subsequent storage without risk of deterioration of the product due to the action of micro-organisms.

Advantages of the improved process are that the required temperature is produced within the seeds or beans in a very short period of time, generally of the order of four minutes; that soya beans are effectively debittered and at the same time brought to a fit condition for milling or preservation; that the heat is generated within the seeds or beans and the size of the latter has no effect upon the duration or uniformity of the treatment, consequently avoiding the necessity for a preliminary grading operation; and that it is a simple matter, by prolonging the treatment for a very short period of time, to reduce the moisture-content of the seeds or beans to a desired level without risk of damaging them. In addition the enzyme content of soya beans is not, or not seriously, reduced and the efficiency of the subsequent step of removing the husks from the seeds is considerably improved since the treatment according to the invention causes contraction of the husk and expansion of the body of the seed.

The process according to the invention may be carried out intermittently, i. e., batchwise, or as a continuous process. In the former case the seeds may be held in a non-metallic container of negligible power factor which can be introduced between suitably shaped electrodes at the location at which the debittering process is to be carried out and, after a suitable lapse of time, subsequently removed and emptied. It is, however, generally more convenient to employ a continuous process in which case, for example, the seeds may be arranged in a layer of suitable depth on a non-conducting endless conveyor belt of negligible power factor, this belt being arranged to travel continuously through the gap between opposed electrodes between which the required alternating electric field is produced. The belt may be arranged subsequently to transport the treated seeds into equipment for cooling and husking the latter such as would ordinarily be employed for these purposes. The dimensions of the electrodes, their distance apart, the thickness of the layer of seeds and the rate of passage of the latter between the electrodes are determined primarily by the frequency of the alternating electric field and the level of power input employed and secondarily by the economic balancing of high frequency and high input energy against output of seeds. These characteristics are also determined to some extent by the nature of the product it is desired to produce, i. e. either an enzyme-active product or a product in which the enzymes have been entirely destroyed. It will be understood that while it is an advantage for some purposes to produce a debittered product in which the enzymes are still, at least to some extent, active, it is desirable for other purposes that the enzymes shall have been completely destroyed. With advantage, means is provided for agitating the seeds during their passage through the high frequency field.

As the result of practical tests, it appears that the range of frequencies normally employed in ordinary commercial radio frequency heating equipment will be suitable for carrying out the present process and a suitable alternating electric field may be produced at frequencies ranging between 25 and 30 megacycles per second. The temperature produced within the seeds is generally of the order of 122° C. but should not exceed 135° C. for the best results.

Generally speaking, the moisture content of the seeds to be subjected to the high frequency heating should be about 12% by weight and preferably not less than, say, 8%. It has been found that a reduction of about 4% in the moisture content can readily be produced in the course of the debittering process but this figure may be varied if desired. The moisture content of the processed seeds will usually depend upon the moisture content of the seeds before processing but should not exceed about 14% since for any higher moisture content, there is a risk of the development of micro-organisms and, with some types of seeds, there may be difficulty in milling.

The time of treatment is governed to a large extent by the controllability of the rate of heating and this, in turn, is governed largely by the method of processing, i. e. whether batchwise or continuous. It has been found possible to process the seeds in 90 seconds when using the frequencies specifically referred to above. In one example of a batchwise process, the batches, each consisting of 100 grammes of seeds having a moisture content of 13.5%, were spread in a layer one inch deep between two electrodes spaced apart by 1.2 inches and each six inches square.

The seeds of each batch were processed at a frequency of 25 to 30 megacycles per second for 2½ minutes with an input of 250 milliamperes.

It should be understood that the specific examples given are not in any way to be considered limitative of the scope of the present invention. They are the best known to us at the present time but further experimental work may disclose more advantageous sets of conditions particularly where seeds other than soya beans are concerned.

What I claim is:

1. A process for heat-treating leguminous seeds which comprises heating the whole seeds at atmospheric pressure rapidly and uniformly throughout their volume to a temperature of the order of 122° C., but not exceeding 135° C., by the application of high frequency electric heating in order to convert into steam part at least of the moisture contained in the seeds.

2. A process as claimed in claim 1, wherein the moisture content of the seeds is reduced during the treatment to a level making the seeds suitable for milling and storage without further drying.

3. A process for debittering soya beans which comprises heating the whole beans at atmospheric pressure rapidly and uniformly throughout their volume to a temperature of the order of 122° C., but not exceeding 135° C., by means of a high frequency alternating electric field for a period of time of the order of four minutes whereby the enzyme content of the beans is retained substantially unimpaired.

ERIC MITCHELL LEARMONTH.

REFERENCES CITED

The following references are of record in the file of this patent:

UNITED STATES PATENTS

| Number | Name | Date |
| --- | --- | --- |
| 1,900,573 | McArthur | Mar. 7, 1933 |
| 1,947,200 | Haas et al. | Feb. 13, 1934 |
| 2,006,265 | Davis | June 25, 1935 |
| 2,162,729 | Levinson | June 20, 1939 |